USO12231213B2

(12) United States Patent
Tsushima

(10) Patent No.: US 12,231,213 B2
(45) Date of Patent: Feb. 18, 2025

(54) CONTROL DEVICE, WIRELESS RELAY DEVICE, COMPUTER READABLE STORAGE MEDIUM, AND CONTROL METHOD

(71) Applicant: HONDA MOTOR CO., LTD., Tokyo (JP)

(72) Inventor: Kosei Tsushima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 598 days.

(21) Appl. No.: 17/456,365

(22) Filed: Nov. 23, 2021

(65) Prior Publication Data

US 2022/0085867 A1  Mar. 17, 2022

Related U.S. Application Data

(63) Continuation of application No. PCT/JP2019/021671, filed on May 31, 2019.

(51) Int. Cl.
*H04B 7/155* (2006.01)
*H04W 4/40* (2018.01)
(Continued)

(52) U.S. Cl.
CPC ............. *H04B 7/155* (2013.01); *H04W 4/40* (2018.02); *H04W 28/16* (2013.01); *H04W 88/04* (2013.01)

(58) Field of Classification Search
CPC ..... H04B 7/155; H04B 7/15542; H04W 4/40; H04W 28/16; H04W 88/04; H04W 16/32
See application file for complete search history.

(56) References Cited

U.S. PATENT DOCUMENTS

2011/0021221 A1   1/2011   Kondo
2012/0250603 A1*  10/2012  Huang ................ H04W 72/535
                                              370/329
(Continued)

FOREIGN PATENT DOCUMENTS

CN   103155670 A   6/2013
CN   103563472 A   2/2014
(Continued)

OTHER PUBLICATIONS

Office Action issued for counterpart Chinese Application 201980095768.2, issued by The State Intellectual Property Office of Peoples Republic of China on Apr. 26, 2023.
(Continued)

Primary Examiner — Abdullahi Ahmed

(57) ABSTRACT

Provided is a control device comprising an information obtaining portion configured to obtain a type of a cell of which a wireless relay device is within range, the wireless relay device being within range of the cell of a radio base station and for relaying communication between the radio base station or a communication terminal, or to obtain a communication allowance of communication between the radio base station and the wireless relay device; and a determination portion configured to determine, based on the type of the cell and the communication allowance obtained by the information obtaining portion, a number of connectable terminals indicating a number of communication terminals that are connectable with the wireless relay device, or a number of available resources indicating a number of wireless resources that are available to use for communication between the wireless relay device and the communication terminal.

22 Claims, 8 Drawing Sheets

(51) Int. Cl.
  *H04W 28/16* (2009.01)
  *H04W 88/04* (2009.01)

(56) References Cited

U.S. PATENT DOCUMENTS

| | | | |
|---|---|---|---|
| 2013/0201902 A1 | 8/2013 | Nagata | |
| 2016/0374129 A1* | 12/2016 | Saiwai | H04W 48/06 |
| 2017/0150503 A1* | 5/2017 | Fukuta | H04L 5/0048 |
| 2017/0317740 A1* | 11/2017 | Basu Mallick | H04W 88/04 |
| 2018/0338345 A1* | 11/2018 | Lee | H04W 84/12 |
| 2019/0379450 A1* | 12/2019 | Kamei | H04W 40/10 |
| 2020/0313761 A1* | 10/2020 | Otaka | H04W 36/0088 |
| 2020/0314846 A1* | 10/2020 | Otaka | H04W 72/541 |

FOREIGN PATENT DOCUMENTS

| | | |
|---|---|---|
| JP | 2011029988 A | 2/2011 |
| JP | 2013098582 A | 5/2013 |
| JP | 2014513469 A | 5/2014 |
| JP | 2015015576 A | 1/2015 |
| WO | 2015159756 A1 | 10/2015 |

OTHER PUBLICATIONS (ISA/237) Written Opinion of the International Search Authority for International Patent Application No. PCT/JP2019/021671, mailed by the Japan Patent Office on Jul. 30, 2019.

\* cited by examiner

CONTROL DEVICE, WIRELESS RELAY DEVICE, COMPUTER READABLE STORAGE MEDIUM, AND CONTROL METHOD

The contents of the following PCT application are incorporated herein by reference:
NO. PCT/JP2019/021671 filed in WO on May 31, 2019

BACKGROUND

1. Technical Field

The present invention relates to a control device, a wireless relay device, a computer readable storage medium, and a control method.

2. Related Art

A wireless relay device that is within range of a radio base station and relays communication between the radio base station and a communication terminal has been known (for example, see Patent Document 1).

PRIOR ART DOCUMENT

Patent Document

Patent Document 1: Japanese Patent Application Publication 2011-029988

DESCRIPTION OF EXEMPLARY EMBODIMENTS

Hereinafter, the present invention will be described through embodiments of the invention, but the following embodiments do not limit the inventions claimed. In addition, not all combinations of features described in the embodiments are essential to the means of solving the invention.

Figure 1:
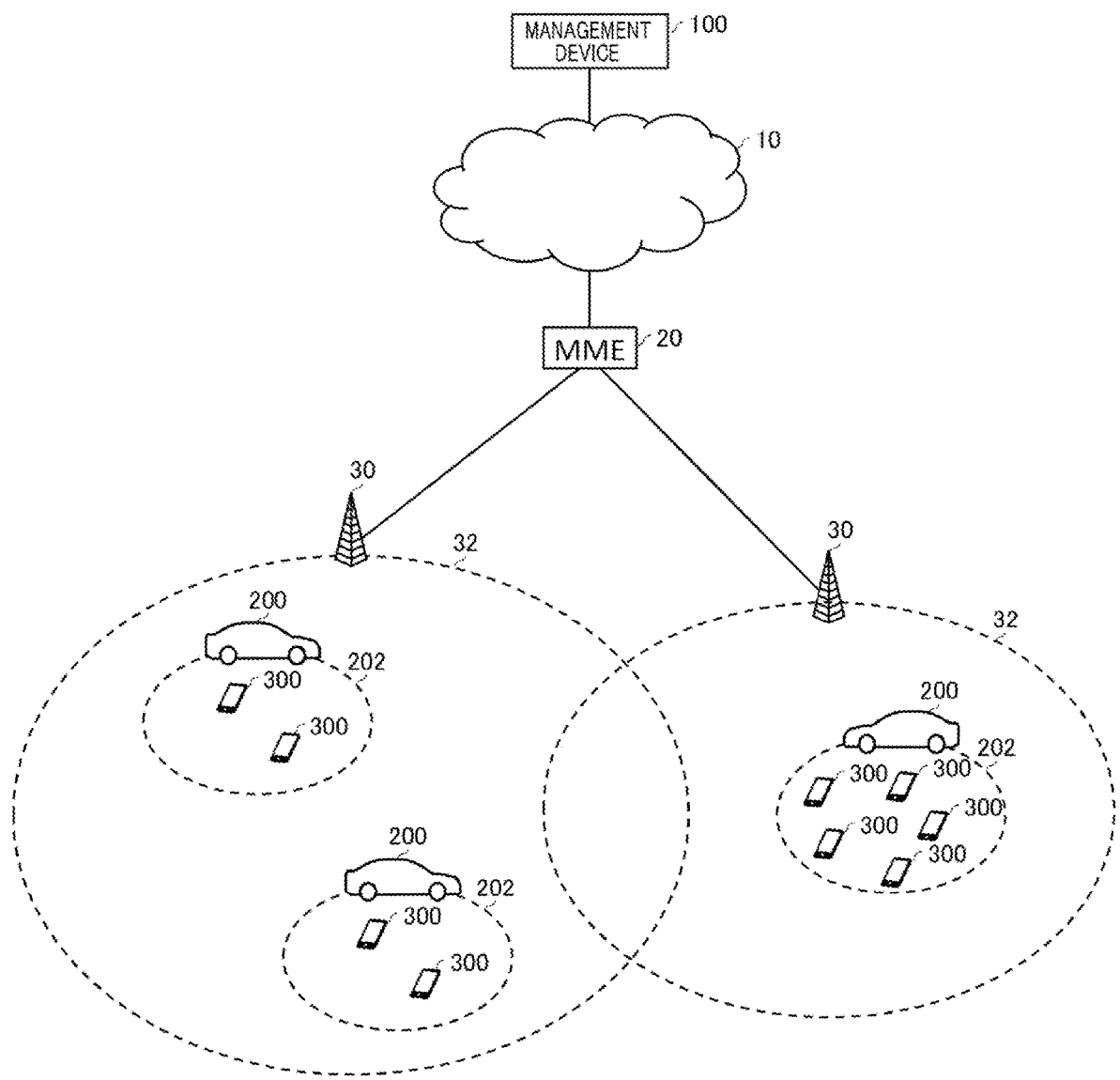
FIG. 1 schematically shows an example of a communication environment of a vehicle 200.

FIG. 1 schematically shows an example of a communication environment of a vehicle 200. The vehicle 200 according to the present embodiment is within range of a cell 32 of a radio base station 30, and has a relay function of relaying communication between the radio base station 30 and a communication terminal 300. The fact that the vehicle 200 is within range of the cell 32 of the radio base station 30 may mean that the vehicle 200 is located in the cell 32 and establishes a wireless communication connection with the radio base station 30. The vehicle 200 may be an example of a wireless relay device.

The vehicle 200 may be an automobile. The vehicle 200 may be any kind of automobile as long as it has a wireless communication function. The vehicle 200 may be, for example, a gasoline vehicle or a so-called eco-car. Examples of types of eco-cars include HV (Hybrid Vehicle), PHEV/PHV (Plug-in Hybrid Vehicle), EV (Electric Vehicle), and FCV (Fuel Cell Vehicle). The vehicle 200 may be an automobile for any purpose. The vehicle 200 may be, for example, a private vehicle, or may be a business vehicle such as a taxi or a bus.

The vehicle 200 can be within range of the cell 32 of a plurality of types of the radio base station 30. The vehicle 200 can be, for example, within range of the cell 32 of the radio base station 30 that conforms to the LTE (Long Term Evolution) communication method. In addition, the vehicle 200 can be, for example, within range of the cell 32 of the radio base station 30 that conforms to the 5G ($5^{th}$ Generation) communication method. In addition, the vehicle 200 can be, for example, within range of the cell 32 of the radio base station 30 that conforms to the 3G ($3^{rd}$ Generation) communication method. In addition, the vehicle 200 can be, for example, within range of the cell 32 of the radio base station 30 that conforms to a mobile communication method of the 6G ($6^{th}$ Generation) communication method and later.

The vehicle 200, for example, generates a wireless communication area 202 and executes wireless communication with the communication terminal 300 that is within range of the wireless communication area 202. The fact that the communication terminal 300 is within range of the wireless communication area 202 may mean that the communication terminal 300 is located in the wireless communication area 202 and establishes a wireless communication connection with the vehicle 200.

The communication terminal 300 may be any communication terminal as long as it has a wireless communication function. The communication terminal 300 is, for example, a mobile phone such as a smartphone, a tablet terminal, a wearable terminal, and a PC (Personal Computer). In addition, the communication terminal 300 may be an IoT (Internet of Thing) device.

The communication method of wireless communication between the vehicle 200 and the communication terminal 300 may be a cellular communication method. That is, the vehicle 200 may be a mobile base station. In addition, the communication method of wireless communication between the vehicle 200 and the communication terminal 300 may be a Wi-Fi (registered trademark) communication method. That is, the vehicle 200 may be a wireless access point.

The relay function of the vehicle 200 may be managed by, for example, a management device 100. The management device 100 has a management function for managing the relay function of the vehicle 200. The vehicle 200 can communicate with the management device 100 via the radio base station 30 and a network 10. The network 10 may include a core network of a mobile communication network. The management device 100 may be arranged in the core network. In addition, the network 10 may include the Internet. The management device 100 may be connected to the Internet.

The management device 100 determines whether activation is possible when, for example, a request for permission to activate relay function is received from the vehicle 200. The management device 100 may determine whether activation is possible based on the communication status of the cell 32 of which the vehicle 200 is within range. For example, the management device 100 determines that activation is not possible when the degree of communication congestion of the cell 32 is higher than a predetermined threshold value, and determines that activation is possible when the degree of communication congestion of the cell 32 is lower than a predetermined threshold value.

When the management device 100 determines that activation is possible, the management device 100 may determine the number of connectable terminals that indicates the number of connectable communication terminals 300 to which the vehicle 200 can be connected. The management device 100 determines the number of connectable terminals based on, for example, the type of the cell 32 of which the vehicle 200 is within range. For example, the larger the communication allowance allocated to the vehicle 200 within range of the cell 32 is for the type of cell 32, the larger the number of connectable terminals determined by the management device 100 is. As a specific example, the management device 100 determines a larger number of connectable terminals when the cell 32 type is a 5G cell as compared with the case where the cell 32 type is an LTE cell. As a result, an appropriate number of connectable terminals can be determined according to the type of the cell 32, the wireless resources in the cell 32 can be effectively utilized, and the degree of communication congestion in the cell 32 can be prevented from becoming excessively high.

The management device 100 may determine the number of connectable terminals based on the communication allowance between the radio base station 30 of which the vehicle 200 is within range and the vehicle 200. For example, the larger the communication allowance, the larger the number of connectable terminals determined by the management device 100 is. The management device 100 may receive information on the communication allowance between the radio base station 30 and the vehicle 200 from the radio base station 30, or may receive it from the vehicle 200. In addition, the management device 100 may determine the communication allowance between the radio base station 30 and the vehicle 200 based on the type of the radio base station 30.

In addition, the management device 100 may determine the number of available resources indicating the number of available wireless resources that the vehicle 200 can use for communication with the communication terminal 300 when it is determined that activation is possible. The management device 100 determines the number of available resources, for example, based on the type of the cell 32 of which the vehicle 200 is within range. For example, the larger the communication allowance allocated to the vehicle 200 within range of the cell 32 is for the type of cell 32, the larger the number of available resources determined by the management device 100 is. As a specific example, the management device 100 determines a larger number of available resources when the cell 32 type is a 5G cell as compared with the case where the cell 32 type is an LTE cell. As a result, an appropriate number of available resources can be determined according to the communication allowance, the wireless resources in the cell 32 can be effectively utilized, and the degree of communication congestion in the cell 32 can be prevented from becoming excessively high.

The management device 100 may determine the number of available resources based on the communication allowance between the radio base station 30 of which the vehicle 200 is within range and the vehicle 200. For example, the larger the communication allowance, the larger the number of available resources determined by the management device 100 is.

It is noted that the management device 100 may determine the number of the connectable terminals or available resources of each of a plurality of vehicles 200 so that the total number of connectable terminals or available resources of the plurality of vehicles 200 that are within range of a first cell 32 is larger than the total number of connectable terminals or available resources of the plurality of vehicles 200 that are within range of a second cell 32 having a smaller communication allowance allocated to the vehicles 200 in comparison to the first cell 32. For example, when the first cell 32 is a 5G cell and the second cell 32 is an LTE cell, the management device 100 determines the number of the connectable terminals or available resources of the plurality of vehicles 200 so that the total number of connectable terminals or available resources of the plurality of vehicles 200 that are within range of the first cell 32 is larger than the total number of connectable terminals or available resources of the plurality of vehicles 200 that are within range of the second cell 32.

In this case, for example, when the number of vehicles 200 within range of the 5G cell is larger than the number of vehicles 200 within range of the LTE cell, the number of connectable terminals or available resources allocated to the vehicles 200 within range of the 5G cell may be smaller than the number of connectable terminals or available resources allocated to the vehicles 200 within range of the LTE cell. As a result, as a whole, it is possible to prevent the degree of communication congestion of the 5G cell from becoming excessively high while making the number of communication terminals 300 within range of one or more vehicles 200 within range of the 5G cell larger than the number of communication terminals 300 within range of one or more vehicles 200 within range of the LTE cell.

Here, the case where the management device 100 has a management function for managing the relay function of the vehicle 200 has been described as an example, but the present invention is not limited to this. For example, an MME (Mobility Management Entity) 20 may have a management function. When the MME 20 receives a request for permission to activate the relay function from the vehicle 200, the MME 20 may send a response to the vehicle 200 including information indicating that activation is possible or activation is not possible, and the number of connectable terminals or available resources, similarly to the abovementioned management device 100.

Figure 2:
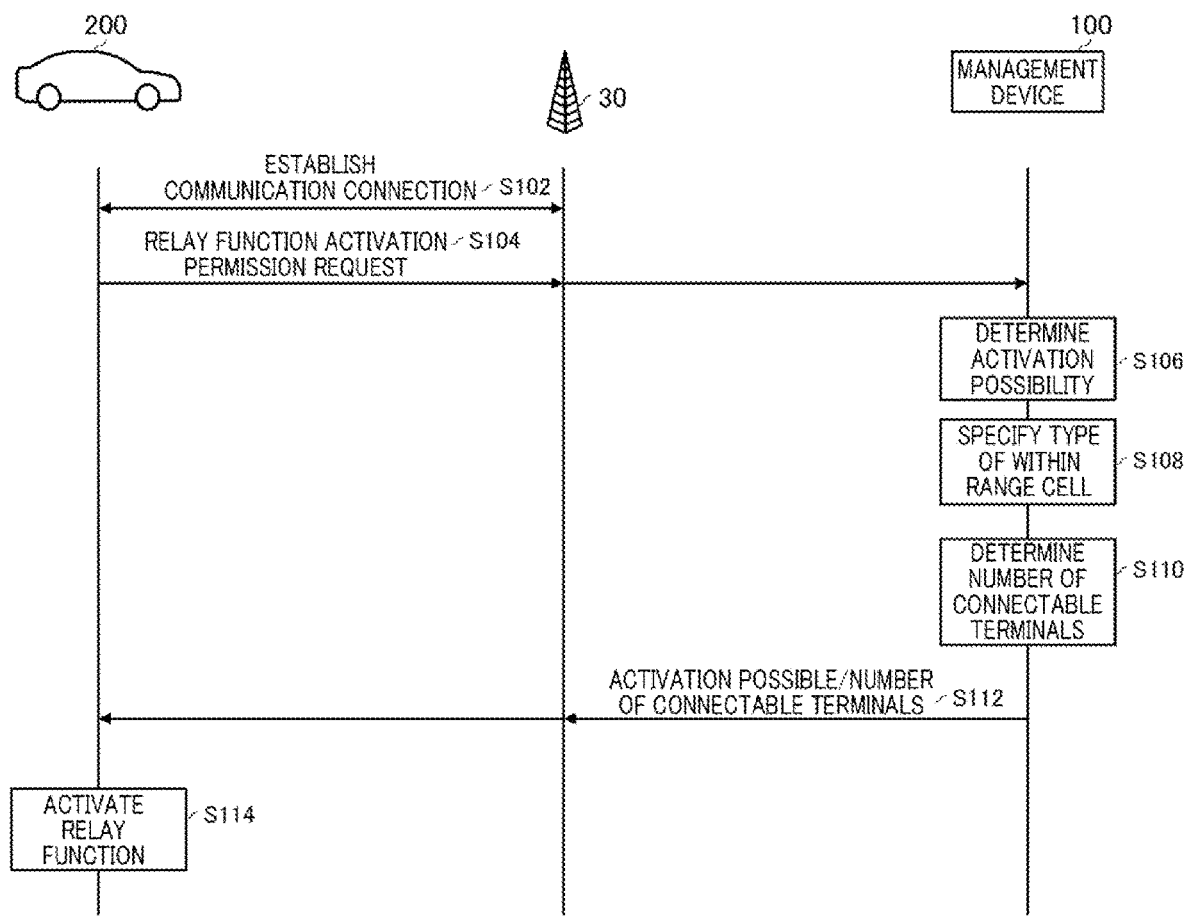
FIG. 2 schematically shows an example of a processing flow by the vehicle 200 and a management device 100.

FIG. 2 schematically shows an example of a flow of processing by the vehicle 200 and the management device 100. Here, the flow of processing when the management device 100 determines the number of connectable terminals of the vehicle 200 based on the type of the cell of which the vehicle 200 is within range is described below.

In step (step may be abbreviated as S) 102, the vehicle 200 and the radio base station 30 establish a wireless communication connection. In S104, the vehicle 200 sends a request for permission to activate the relay function to the management device 100 via the radio base station 30.

In S106, the management device 100 determines whether the relay function can be activated. Here, the description will be continued assuming that it is determined that activation is possible. In S108, the management device 100 identifies the type of the cell of which the vehicle 200 is within range. The type of the within range cell may be notified to the management device 100 by the vehicle 200. In addition, the management device 100 may determine the type of the within range cell.

In S110, the management device 100 determines the number of connectable terminals based on the type of within range cell specified in S108. In S112, the management device 100 sends the information indicating that activation is possible and the number of connectable terminals determined in S110 to the vehicle 200 via the radio base station 30.

In S114, the vehicle 200 activates the relay function. The vehicle 200 provides a relay function to the communication terminals 300 up to the number of connectable terminals received in S112.

The management device 100 may determine the number of available resources based on the type of within range cell of the vehicle 200 in the same flow as the flow of processing shown in FIG. 2. In addition, the management device 100 may determine the number of connectable terminals based on the communication allowance between the vehicle 200 and the radio base station 30 in the same flow as the flow of processing shown in FIG. 2. In addition, the management device 100 may determine the number of available resources based on the communication allowance between the vehicle 200 and the radio base station 30 in the same flow as the flow of processing shown in FIG. 2.

In FIG. 1 and FIG. 2, a case where the vehicle 200 sends a request for permission to activate the relay function to the management device 100 and activates the relay function when it is determined that activation is possible has been described, but it is not limited to this. The vehicle 200 may be able to activate the relay function without following the procedure of sending the request for permission for activation and receiving the information indicating that activation is possible. In this case, when the vehicle 200 activates the relay function, it may send a request for determining the number of connectable terminals or available resources to the management device 100, and receive the number of connectable terminals or available resources determined by the management device 100 from the management device 100.

In FIG. 1 and FIG. 2, the case where the management device 100 determines the number of connectable terminals or available resources has been mainly described, but the determination of the number of connectable terminals or available resources may be performed by the vehicle 200.

Figure 3:
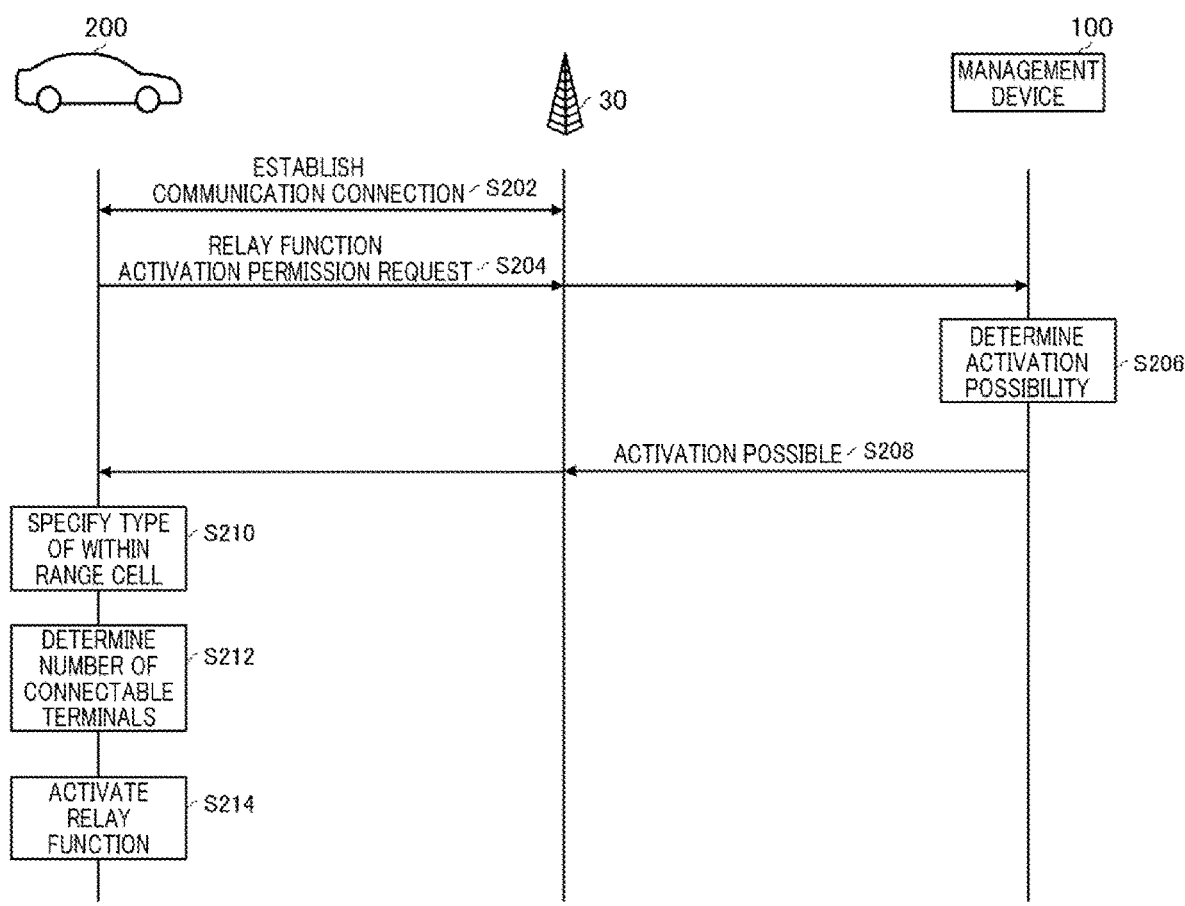
FIG. 3 schematically shows an example of a processing flow by the vehicle 200 and the management device 100.

FIG. 3 schematically shows an example of the flow of processing by the vehicle 200 and the management device 100. Here, the flow of processing when the vehicle 200 determines the number of connectable terminals of the vehicle 200 based on the type of the within range cell of the vehicle 200 will be described.

In S202, the vehicle 200 and the radio base station 30 establish a wireless communication connection. In S204, the vehicle 200 sends a request for permission to activate the relay function to the management device 100 via the radio base station 30.

In S206, the management device 100 determines whether the relay function can be activated. Here, the description will be continued assuming that it is determined that activation is possible. In S208, the management device 100 sends information indicating that activation is possible to the vehicle 200 via the radio base station 30.

In S210, the vehicle 200 specifies the type of within range cell. In S212, the vehicle 200 determines the number of connectable terminals based on the type of the within range cell specified in S210. In S212, the vehicle 200 activates the relay function. The vehicle 200 provides a relay function to the communication terminals 300 up to the number of connectable terminals determined in S212.

The vehicle 200 may determine the number of available resources based on the type of within range cell of the vehicle 200 in the same flow as the processing flow shown in FIG. 3. In addition, the vehicle 200 may determine the number of connectable terminals based on the communication allowance between the vehicle 200 and the radio base station 30 in the same flow as the processing flow shown in FIG. 3. In addition, the vehicle 200 may determine the number of available resources based on the communication allowance between the vehicle 200 and the radio base station 30 in the same flow as the processing flow shown in FIG. 3.

In FIG. 3, a case where the vehicle 200 sends a request for permission to activate the relay function to the management device 100 and activates the relay function when it is determined that activation is possible has been described, but it is not limited to this. The vehicle 200 may be able to activate the relay function without following the procedure of sending the request for permission for activation and receiving the information indicating that activation is possible. In this case, the vehicle 200 may determine the number of connectable terminals or available resources at an arbitrary timing before activating the relay function.

Figure 4:
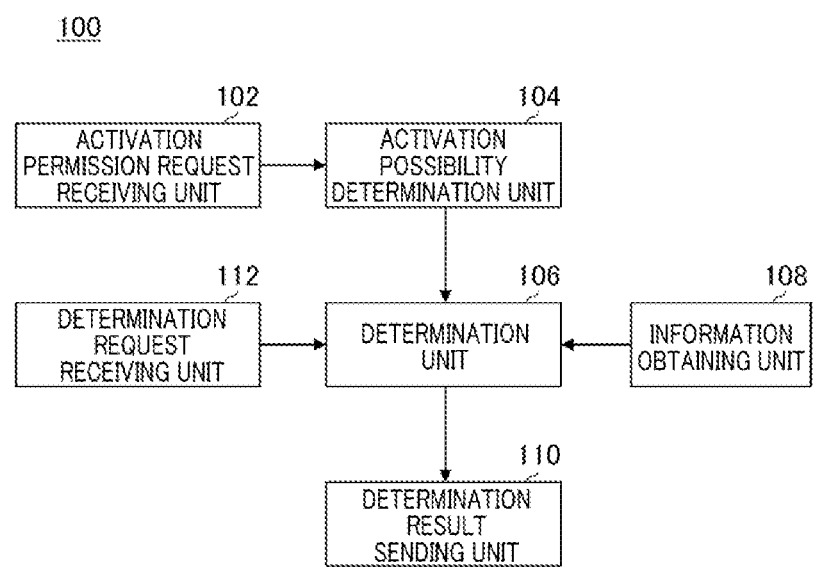
FIG. 4 schematically shows an example of a functional configuration of the management device 100.

FIG. 4 schematically shows an example of a functional configuration of the management device 100. The management device 100 includes an activation permission request receiving unit 102, an activation possibility determination portion 104, a determination portion 106, an information obtaining portion 108, a determination result sending unit 110, and a determination request receiving unit 112.

The activation permission request receiving unit 102 receives an activation permission request sent by the vehicle 200. The activation permission request receiving unit 102 may receive the activation permission request sent by the vehicle 200 via the radio base station 30.

The activation possibility determination portion 104 determines whether the relay function can be activated by the vehicle 200 in response to the activation permission request received by the activation permission request receiving unit 102. The activation possibility determination portion 104 determines whether the relay function can be activated based on, for example, the communication status of the radio base station 30 of which the vehicle 200 is within range.

When the activation possibility determination portion 104 determines that activation is possible, the determination portion 106 determines the number of connectable terminals indicating the number of communication terminals 300 to which the vehicle 200 can connect, or the number of available resources indicating the number of wireless resources that the vehicle 200 can use for communication with the communication terminal 300.

The information obtaining portion 108 obtains information related to the vehicle 200 that has sent the activation permission request. The information obtaining portion 108 obtains, for example, the type of the cell of which the vehicle 200 is within range. The information obtaining portion 108 may obtain the type of cell notified by the vehicle 200. In addition, the information obtaining portion 108 may obtain the type of cell notified by the radio base station 30. In addition, the information obtaining portion 108 may determine the type of cell by itself.

In addition, for example, the information obtaining portion 108 obtains the communication allowance for communication between the vehicle 200 and the radio base station 30. The information obtaining portion 108 may obtain the communication allowance notified by the vehicle 200. In addition, the information obtaining portion 108 may obtain the communication allowance notified by the radio base station 30. In addition, the information obtaining portion 108 may determine the communication allowance by itself.

The determination portion 106 may determine the number of connectable terminals based on the information obtained by the information obtaining portion 108. The determination portion 106 determines, for example, the number of connectable terminals based on the type of cell obtained by the information obtaining portion 108. The determination portion 106 determines a larger number of connectable terminals when the type of cell is a cell having a larger communication allowance allocated to the vehicle 200 that is within range of the cell.

As a specific example, the determination portion 106 determines a larger number of connectable terminals when the type of cell is a 5G cell than when the type of cell is an LTE cell or a 3G cell. In addition, for example, the determination portion 106 determines a larger number of connectable terminals when the type of cell is an LTE cell an when the type of cell is a 3G cell.

In addition, the determination portion 106 determines, for example, the number of connectable terminals based on the communication allowance obtained by the information obtaining portion 108. For example, the larger the communication allowance, the larger the number of connectable terminals determined by the determination portion 106 is.

The determination portion 106 may determine the number of the connectable terminals of each of a plurality of vehicles 200 so that the total number of connectable terminals of the plurality of vehicles 200 that are within range of a first cell is larger than the total number of connectable terminals of the plurality of vehicles 200 that are within range of a second cell having a smaller communication allowance allocated to the vehicles 200 in comparison to the first cell.

As a specific example, the determination portion 106 determines the number of connectable terminals for the plurality of vehicles 200 so that the total number of connectable terminals of the plurality of vehicles 200 that are within range of the first cell that is a 5G type cell is larger than the total number of connectable terminals of the plurality of vehicles 200 that are within range of the second cell that is an LTE or 3G type cell. In addition, the determination portion 106 determines the number of connectable terminals for the plurality of vehicles 200 so that the total number of connectable terminals of the plurality of vehicles 200 that are within range of the first cell that is an LTE type cell is larger than the total number of connectable terminals of the plurality of vehicles 200 that are within range of the second cell that is a 3G type cell.

The determination portion 106 may determine the number of available resources based on the information obtained by the information obtaining portion 108. The determination portion 106 determines, for example, the number of available resources based on the type of cell obtained by the information obtaining portion 108. The determination portion 106 determines a larger number of available resources when the type of cell is a cell having a larger communication allowance allocated to the vehicle 200 that is within range of the cell.

As a specific example, the determination portion 106 determines a larger number of available resources when the type of cell is a 5G cell than when the type of cell is an LTE cell or a 3G cell. In addition, for example, the determination portion 106 determines a larger number of available resources when the type of cell is an LTE cell than when the type of cell is a 3G cell.

In addition, the determination portion 106 determines, for example, the number of available resources based on the communication allowance obtained by the information obtaining portion 108. For example, the larger the communication allowance, the larger the number of available resources determined by the determination portion 106 is.

The determination portion 106 may determine the number of the available resources of each of a plurality of vehicles 200 so that the total number of available resources of the plurality of vehicles 200 that are within range of a first cell is larger than the total number of available resources of the plurality of vehicles 200 that are within range of a second cell having a smaller communication allowance allocated to the vehicles 200 in comparison to the first cell.

As a specific example, the determination portion 106 determines the number of available resources for the plurality of vehicles 200 so that the total number of available resources of the plurality of vehicles 200 that are within range of the first cell that is a 5G type cell is larger than the total number of available resources of the plurality of vehicles 200 that are within range of the second cell that is an LTE or 3G type cell. In addition, the determination portion 106 determines the number of available resources for the plurality of vehicles 200 so that the total number of available resources of the plurality of vehicles 200 that are within range of the first cell that is an LTE type cell is larger than the total number of available resources of the plurality of vehicles 200 that are within range of the second cell that is a 3G type cell.

The information obtaining portion 108 may obtain the movement speed of each of the plurality of vehicles 200. The determination portion 106 may determine, for example, a larger number of connectable terminals or a larger number of available resources for the vehicle 200 having a slower movement speed among the plurality of vehicles 200 that are within range of one cell. As a result, it is possible to allocate a larger number of connectable terminals or a larger number of available resources to the vehicle 200 having a slower movement speed that is more likely to have more stable wireless communication with the communication terminal 300.

The information obtaining portion 108 may obtain movement information indicating whether each of the plurality of vehicles 200 are moving or not. The determination portion 106 determines, for example, a larger number of connectable terminals or a larger number of available resources for a non-moving vehicle 200 as compared with a moving vehicle 200 among the plurality of vehicles 200 that are within range of one cell. As a result, it is possible to allocate a larger number of connectable terminals or a larger number of available resources to the non-moving vehicle 200 that is more likely to have more stable wireless communication with the communication terminal 300.

The information obtaining portion 108 may obtain location information of each of the plurality of vehicles 200. The determination portion 106 may determine, for example, a larger number of connectable terminals or a larger number of available resources for a vehicle 200 that is closer to the radio base station 30 forming the first cell among the plurality of vehicles 200 that are within range of one cell. As a result, it is possible to allocate a larger number of connectable terminals or a larger number of available resources to the vehicle 200 that has a higher reception intensity of the radio wave from the radio base station 30 and is more likely to have more stable wireless communication with the communication terminal 300.

The information obtaining portion 108 may obtain radio wave reception intensity from the radio base station 30 of each of the plurality of vehicles 200. The determination portion 106 may determine, for example, a larger number of connectable terminals or a larger number of available resources for a vehicle 200 that has a stronger radio wave reception intensity among the plurality of vehicles 200 that are within range of one cell. As a result, it is possible to allocate a larger number of connectable terminals or a larger number of available resources to the vehicle 200 that has a higher radio wave reception intensity from the radio base station 30 and is more likely to have more stable wireless communication with the communication terminal 300.

When the vehicle 200 is an automobile equipped with a battery, the information obtaining portion 108 may obtain information indicating whether each of the plurality of vehicles 200 is charging its battery. The determination portion 106 may determine, for example, a larger number of connectable terminals or a larger number of available resources for a charging vehicle 200 as compared with a non-charging vehicle 200 among the plurality of vehicles 200 that are within range of one cell. As a result, it is possible to allocate a larger number of connectable terminals or a larger number of available resources to the vehicle 200 in which its battery power will not be exhausted and the relay function will not be terminated while the relay function is being executed.

The determination result sending unit 110 sends the determination result by the activation possibility determination portion 104 and the determination result by the determination portion 106 to the vehicle 200. The determination result sending unit 110 sends the information indicating whether activation is possible and the number of connectable terminals or the number of available resources determined by the determination portion 106 to the vehicle 200.

The determination request receiving unit 112 receives the determination request for the number of connectable terminals or the number of available resources from the vehicle 200. The determination portion 106 may determine the number of connectable terminals or the number of available resources for the vehicle 200 when the determination request receiving unit 112 receives the determination request of the number of connectable terminals or the number of available resources from the vehicle 200.

Figure 5:
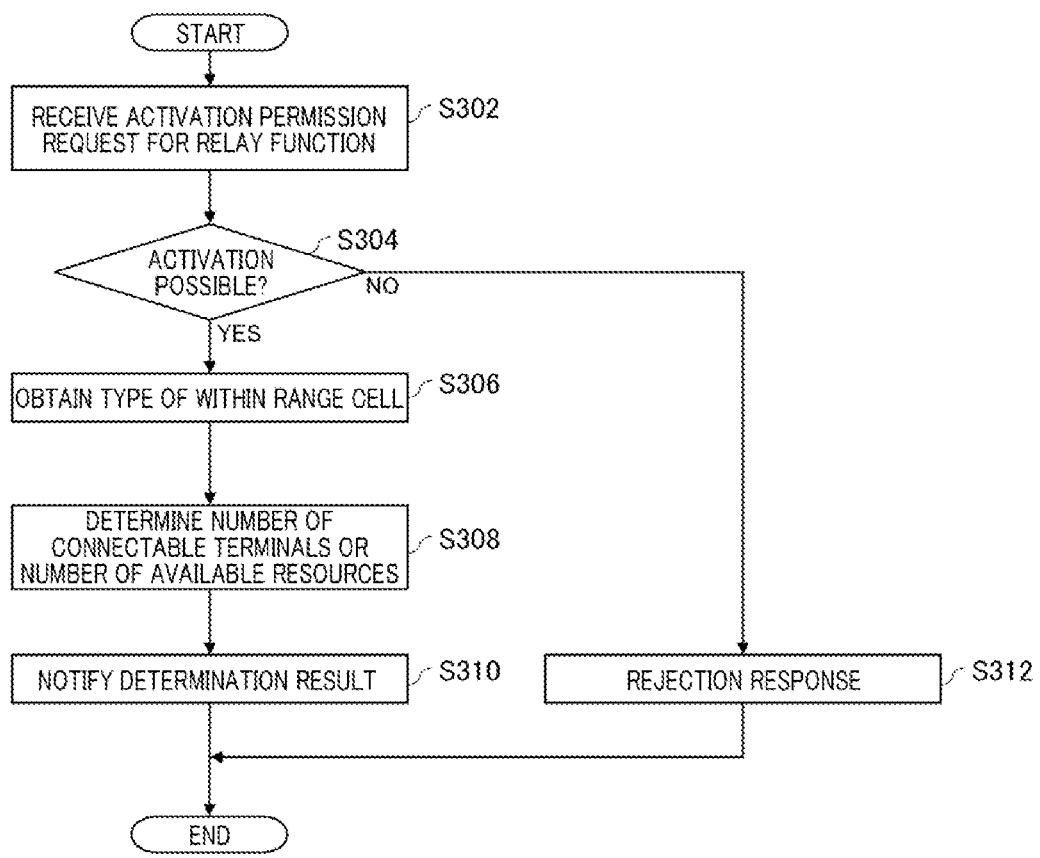
FIG. 5 schematically shows an example of a processing flow by the management device 100.

FIG. 5 schematically shows an example of the processing flow by the management device 100. Here, the flow of processing from reception of the relay function activation permission request from the vehicle 200 to the response by the management device 100 will be described.

In S302, the activation permission request receiving unit 102 receives the activation permission request of the relay function sent by the vehicle 200. In S304, the activation possibility determination portion 104 determines whether activation is possible in response to the activation permission request received in S302. When it is determined that activation is possible, the process proceeds to S306, and when it is determined that activation is not possible, the process proceeds to S312.

In S306, the information obtaining portion 108 obtains the type of within range cell of the vehicle 200 that sent the activation permission request. In S308, the determination portion 106 determines the number of connectable terminals and the number of available resources based on the type of within range cell obtained in S306. In S310, the determination result sending unit 110 notifies a determination result including the information indicating that activation of the relay function is possible and the number of connectable terminals and the number of available resources determined in S308 to the vehicle 200.

In S312, the determination result sending unit 110 notifies a rejection response indicating that activation of the relay function is not possible to the vehicle 200. It is noted that FIG. 5 illustrates a case where the information obtaining portion 108 obtains the type of the within range cell in S306, the information obtaining portion 108 may obtain the communication allowance instead of the type of the within range cell.

Figure 6:
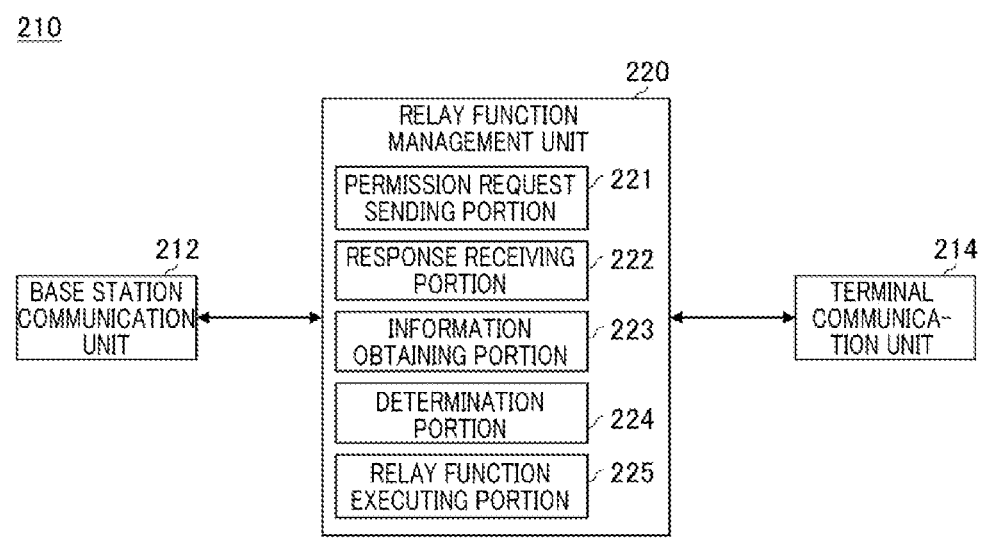
FIG. 6 schematically shows an example of a functional configuration of an in-vehicle device 210 of the vehicle 200 having a function of determining a number of connectable terminals or a number of available resources.

FIG. 6 schematically shows an example of the functional configuration of an in-vehicle device 210 included in the vehicle 200 having a function of determining the number of connectable terminals and the number of available resources. The in-vehicle device 210 includes a base station communication unit 212, a terminal communication unit 214, and a relay function management unit 220.

The base station communication unit 212 communicates with the radio base station 30. The base station communication unit 212 establishes a wireless communication connection with the radio base station 30 and performs wireless communication with the radio base station 30.

The terminal communication unit 214 communicates with the communication terminal 300. The terminal communication unit 214 establishes a wireless communication connection with one or more communication terminals 300, and performs wireless communication with one or more communication terminals 300.

The relay function management unit 220 manages the relay function of the vehicle 200. The relay function management unit 220 includes a permission request sending portion 221, a response receiving portion 222, an information obtaining portion 223, a determination portion 224, and a relay function executing portion 225.

The permission request sending portion 221 sends an activation permission request of the relay function. The permission request sending portion 221 sends the activation permission request to the management device 100 via a wireless communication connection with the radio base station 30 by the base station communication unit 212.

The permission request sending portion 221 sends, for example, the activation permission request for the relay function according to the instructions of an occupant of the vehicle 200. The permission request sending portion 221 may send the activation permission request to the management device 100 in response to a condition preset as a condition for sending the activation permission request being satisfied. For example, the permission request sending portion 221 sends the activation permission request when the vehicle 200 is stopped, when the vehicle 200 is standing, when the vehicle 200 is parked, or when the movement speed of the vehicle 200 becomes slower than a predetermined speed.

The response receiving portion 222 receives the response to the activation permission request sent by the permission request sending portion 221 from the management device 100. The response includes information indicating if activation is possible or activation is not possible.

The information obtaining portion 223 obtains various types of information. The information obtaining portion 223 obtains, for example, the type of the cell of which the vehicle 200 is within range. In addition, the information obtaining portion 223 obtains, for example, the communication allowance of the communication between the radio base station 30 of which the vehicle 200 is within range and the vehicle 200.

When the response receiving portion 222 receives the information indicating that activation is possible, the determination portion 224 determines the number of connectable terminals and the number of available resources based on the information obtain by the information obtaining portion 223. The determination portion 224 determines, for example, the number of connectable terminals based on the type of cell obtained by the information obtaining portion 223. In addition, the determination portion 224 determines, for example, the number of connectable terminals based on the communication allowance obtained by the information obtaining portion 223. In addition, the determination portion 224 determines, for example, the number of available resources based on the type of cell obtained by the information obtaining portion 223. In addition, the determination portion 224 determines, for example, the number of available resources based on the communication allowance obtained by the information obtaining portion 223.

The relay function executing portion 225 activates the relay function and executes the relay function when the response receiving portion 222 receives the information indicating that activation is possible. The relay function executing portion 225 may execute the relay function for the communication terminal 300 up to the number of connectable terminals determined by the determination portion 224. In addition, the relay function executing portion 225 may execute the relay function for the communication terminal 300 up to the number of available resources determined by the determination portion 224.

Figure 7:
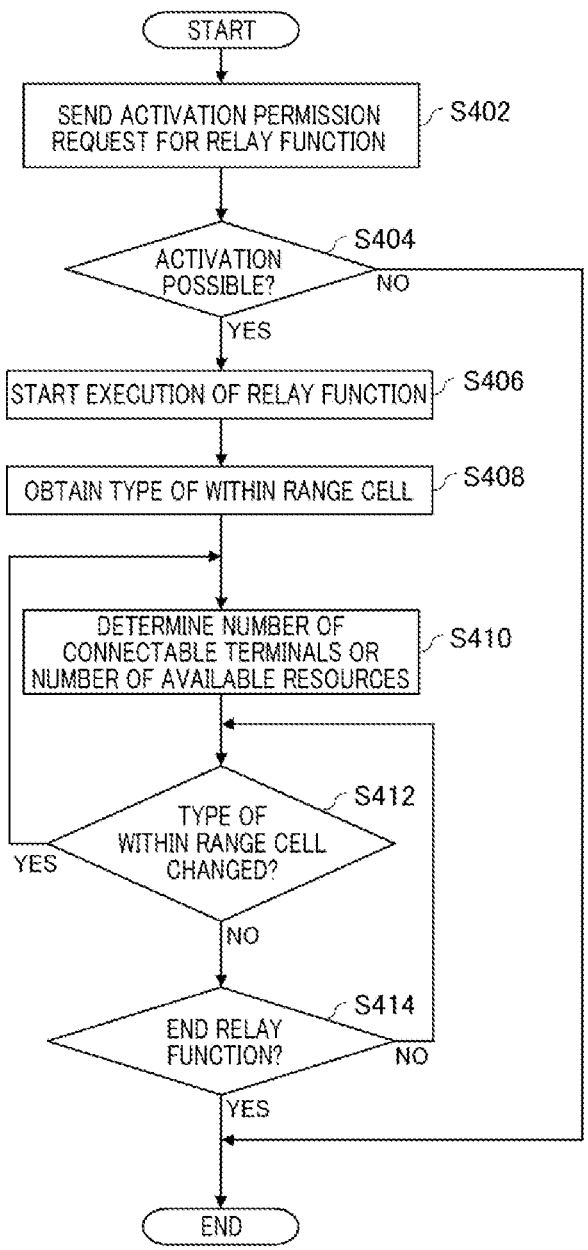
FIG. 7 schematically shows an example of a processing flow by the in-vehicle device 210.

FIG. 7 schematically shows an example of the processing flow by the in-vehicle device 210. Here, the flow of processing when the in-vehicle device 210 sends an activation permission request of the relay function is described.

In S402, the permission request sending portion 221 sends the activation permission request of the relay function to the management device 100. In S404, the determination portion 224 determines whether activation of the relay function is possible. The determination portion 224 determines that activation is possible when the response received by the response receiving portion 222 includes information indicating that activation is possible, and when information indicating that activation is not possible is included, it determines that activation is not possible. When it is determined that activation is possible, the process proceeds to S406, and when it is determined that activation is not possible, the process ends.

In S406, the relay function executing portion 225 starts execution of the relay function. In S408, the information obtaining portion 223 obtains the type of the within range cell of which the vehicle 200 is within range. In S410, the determination portion 224 determines the number of connectable terminals or the number of available resources based on the type of the within range cell obtained in S408.

In S412, the determination portion 224 determines whether the type of the cell of which the vehicle 200 is within range has been changed. The determination portion 224 may determine whether the type of the cell of which the vehicle 200 is within range has been changed by appropriately referring to the type of cell obtained by the information obtaining portion 223. When it is determined that it has been changed, the process proceeds to S410, and when it is determined that it has not been changed, the process proceeds to S414.

In S414, the relay function executing portion 225 determines whether to end the relay function. The relay function executing portion 225 determines, for example, to end the relay function when a termination instruction is received from the occupant of the vehicle 200. When it is determined to not end, the process returns to S412. When it is determined to end, the relay function executing portion 225 ends the relay function, and the process ends.

Figure 8:
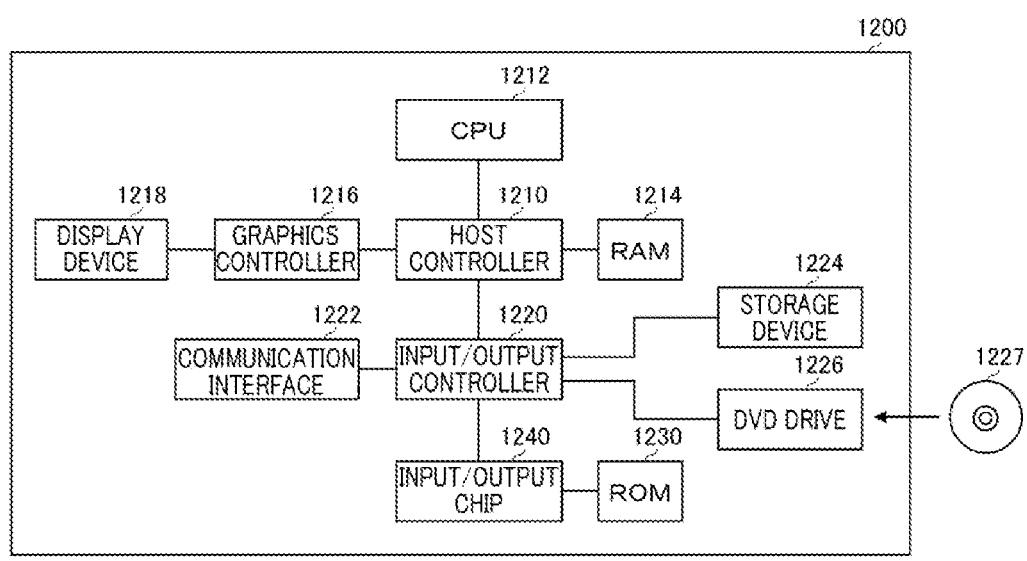
FIG. 8 schematically shows an example of a hardware configuration of a computer 1200 that functions as the management device 100 or the in-vehicle device 210.

FIG. 8 schematically shows an example of the hardware configuration of a computer 1200 that functions as the management device 100 or the in-vehicle device 210. A program installed on the computer 1200 causes the computer 1200 to function as one or more "parts" of the device according to the abovementioned embodiment, or causes the computer 1200 to execute an operation associated with the device according to the embodiment or the one or more parts, and/or allows the computer 1200 to execute a process or steps of the process according to the abovementioned embodiment. Such a program may be executed by a CPU 1212 to cause the computer 1200 to execute certain operations associated with some or all of the blocks of the flowcharts and block diagrams described in the present description.

The computer 1200 according to the present embodiment includes a CPU 1212, a RAM 1214, and a graphics controller 1216, which are connected to each other by a host controller 1210. The computer 1200 also includes input/output units such as a communication interface 1222, a storage device 1224, a DVD drive 1226, and an IC card drive, which are connected to the host controller 1210 via an input/output controller 1220. The DVD drive 1226 may be a DVD-ROM drive, a DVD-RAM drive, or the like. The storage device 1224 may be a hard disk drive, a solid state drive, or the like. The computer 1200 also includes a legacy input/output unit such as a ROM 1230 and a touch panel, which are connected to the input/output controller 1220 via an input/output chip 1240.

The CPU 1212 operates according to programs stored in the ROM 1230 and the RAM 1214, thereby controlling each unit. The graphics controller 1216 obtains image data generated by the CPU 1212 in a frame buffer or the like provided in the RAM 1214 or itself so that the image data is displayed on a display device 1218. The computer 1200 does not have to include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 in the computer 1200. The DVD drive 1226 reads a program or data from a DVD-ROM 1227 or the like and provides it to the storage device 1224. The IC card drive reads the program and data from an IC card and/or writes the program and data to an IC card.

The ROM 1230 stores a boot program or the like executed by the computer 1200 at the time of activation and/or a program depending on the hardware of the computer 1200. The input/output chip 1240 may also connect various input/output units to the input/output controller 1220 via a USB port or the like.

The program is provided by a computer-readable storage medium such as the DVD-ROM 1227 or the IC card. The program is read from the computer-readable storage medium, installed in the storage device 1224, the RAM 1214, or the ROM 1230, which are also examples of the computer-readable storage medium, and executed by the CPU 1212. The information processing described in these programs is read by the computer 1200 and provides a link between the program and the various types of hardware resources described above. The devices or methods may be configured to implement the operation or processing of information according to the use of the computer 1200.

For example, when communication is executed between the computer 1200 and an external device, the CPU 1212 may execute a communication program loaded in the RAM 1214, and execute communication processing on the communication interface 1222 based on the processing described in the communication program. Under the control of the CPU 1212, the communication interface 1222 reads transmission data stored in a transmission buffer area provided in a recording medium such as the RAM 1214, the storage device 1224, the DVD-ROM 1227, or the IC card, and send the read transmission data to a network or write received data received from a network to a reception buffer area provided in the recording medium.

In addition, the CPU 1212 may make the RAM 1214 read all or necessary parts of a file or a database stored in an external recording medium such as the storage device 1224, the DVD drive 1226 (DVD-ROM 1227), or the IC card, and execute various types of processing on the data in the RAM 1214. The CPU 1212 may then write back the processed data to the external recording medium.

Various types of information such as various types of programs, data, tables, and databases may be stored in the recording medium and processed. The CPU 1212 may execute various types of processing, as described throughout the present disclosure, including various types of operations instructed by command sequences of a program, information processing, conditional judgement, conditional branching, unconditional branching, and information searching/replacement with respect to the data read from the RAM 1214, and write back to the results to the RAM 1214. In addition, the CPU 1212 may search for information in a file, a database, or the like in a recording medium. For example, when a plurality of entries each having an attribute value of a first attribute associated with an attribute value of a second attribute are stored in the recording medium, the CPU 1212 may search for an entry that matches a condition specified by the first attribute from a plurality of entries, read the attribute value of the second attribute stored in the entry, and thus obtain the attribute value of the second attribute associated with the first attribute satisfying the predetermined condition.

The program or software module described above may be stored on the computer 1200 or in a computer-readable storage medium near the computer 1200. In addition, a recording medium such as a hard disk or a RAM provided in a dedicated communication network or a server system connected to the Internet can be used as the computer-readable storage medium, thereby allowing the program to be transferred to the computer 1200 via the network.

The blocks in the flowchart and the block diagram in the above embodiment may represent the stage of the process in which the operation is executed or the "part" of the device having a role of executing the operation. Specific stages and "parts" may be implemented by dedicated circuits, programmable circuits supplied with computer-readable instructions stored on computer-readable storage media, and/or a processor provided with computer-readable instructions stored on computer-readable storage media. Dedicated circuits may include digital and/or analog hardware circuits, and may include integrated circuits (ICs) and/or discrete circuits. Programmable circuits may include reconfigurable hardware circuits including logical products, logical sums, exclusive logical sums, negative logical products, negative logical sums, and other logical operations, flip-flops, registers, and memory elements, such as, for example, field programmable gate arrays (FPGA), programmable logic arrays (PLA).

The computer-readable storage medium may include any tangible device capable of storing instructions executed by the appropriate device. As a result, the computer-readable storage medium having the instructions stored therein will be equipped with a product that contains instructions that can be executed to create means for performing the operations specified by the flowcharts and block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage media may include floppy (registered trademark) disks, diskettes, hard disks, Random Access Memory (RAM), Read-Only Memory (ROM), Erasable Programmable Read-Only Memory (EPROM or flash memory), Electrically Erasable Programmable Read Only Memory (EEPROM), Static Random Access Memory (SRAM), Compact Disc Read Only Memory (CD-ROM), Digital Versatile Discs (DVD), Blu-ray (registered trademark) Discs, memory sticks, and integrated circuit cards.

The computer-readable instructions may include a source code or an object code written in any combination of one or more programming languages, including assembler instructions, Instruction Set Architecture (ISA) instructions, machine instructions, machine-dependent instructions, microcode, firmware instructions, state-setting data, or object-oriented programming such as Smalltalk, JAVA (registered trademark), and C ++, and traditional procedural programming languages such as the "C" programming language or a similar programming language.

The computer-readable instructions may be provided in the processor of a general computer, a special purpose computer, or another programmable data processing device, or a programmable circuit locally or via a Local Area Network (LAN) or a Wide Area Network (WAN) in order to generate means for the general purpose computer, the special purpose computer, or the processor of the other programmable data processing device, or the programmable circuit to perform an operation specified in the flowcharts or block diagrams. Examples of the processor include computer processors, processing units, microprocessors, digital signal processors, controllers, and microcontrollers.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 network, 20 MME, 30 radio base station, 32 cell, 100 management device, 102 activation permission request receiving unit, 104 activation possibility determination portion, 106 determination portion, 108 information obtaining portion, 110 determination result sending unit, 112 determination request receiving unit, 200 vehicle, 210 in-vehicle device, 212 base station communication unit, 214 terminal communication unit, 220 relay function management unit, 221 permission request sending portion, 222 response receiving portion, 223 information obtaining portion, 224 determination portion, 225 relay function executing portion, 300 communication terminal, 1200 computer, 1210 host controller, 1212 CPU, 1214 RAM, 1216 graphics controller, 1218 display device, 1220 input/output controller, 1222 communication interface, 1224 storage device, 1226 DVD drive, 1227 DVD-ROM, 1230 ROM, 1240 I/O chip

What is claimed is:

1. A control device, comprising:
   an information obtaining portion configured to obtain a type of a cell of which a wireless relay device is within range, the wireless relay device being within range of the cell of a radio base station and for relaying communication between the radio base station and a communication terminal; and
   a determination portion configured to determine, based on the type of the cell obtained by the information obtaining portion, a number of the connectable terminals indicating a number of communication terminals that are connectable with the wireless relay device, or a number of available resources indicating a number of wireless resources that are available to use for communication between the wireless relay device and the communication terminal.

2. The control device according to claim 1, wherein the determination portion is configured to determine a larger number of connectable terminals or a larger number of available resources when the type of the cell is a cell having a larger communication allowance allocated to the wireless relay device that is within range of the cell.

3. The control device according to claim 2, wherein the type of the cell includes an LTE (Long Term Evolution) cell and a 5G ($5^{th}$ Generation) cell, and the determination portion is configured to determine the larger number of connectable terminals or the larger number of available resources when the type of the cell is the 5G cell as compared with a case where the type of the cell is the LTE cell.

4. A control device, comprising:
   an information obtaining portion configured to obtain a communication allowance of communication between a radio base station and a wireless relay device, the wireless relay device being within range of the cell of the radio base station and for relaying communication between the radio base station and a communication terminal; and
   a determination portion configured to determine, based on the communication allowance obtained by the information obtaining portion, a number of the connectable terminals indicating a number of communication terminals that are connectable with the wireless relay device, or a number of available resources indicating a number of wireless resources that are available to use for communication between the wireless relay device and the communication terminal; wherein
   the determination portion is configured to determine the number of connectable terminals or the number of available resources for each of a plurality of the wireless relay devices so that a total number of the number of connectable terminals or the total number of the number of available resources of the plurality of the wireless relay devices within range of a first cell is larger than a total number of the number of connectable terminals or the total number of the number of available resources of the plurality of the wireless relay devices within range of a second cell having a smaller communication allowance allocated to the wireless relay device in comparison to the first cell.

5. The control device according to claim 4, wherein the information obtaining portion is configured to obtain the communication allowance, and the determination portion is configured to determine the number of connectable terminals or the number of available resources based on the communication allowance.

6. The control device according to claim 5, wherein, the larger the communication allowance is, the larger the number of connectable terminals or the larger the number of available resources determined by the determination portion is.

7. The control device according to claim 5, wherein the information obtaining portion is configured to obtain, as the communication allowance, a bandwidth allocated to the wireless relay device by the radio base station.

8. The control device according to claim 1, further comprising
   a determination request receiving unit configured to receive a determination request of the number of connectable terminals or the number of available resources from the wireless relay device, and
   a determination result sending unit configured to send, to the wireless relay device from which the determination request was sent, the number of connectable terminals or the number of available resources determined by the determination portion in response to the determination request.

9. The control device according to claim 4, wherein the determination portion is configured to determine the number of connectable terminals for each of the plurality of the wireless relay devices so that the total number of the number of connectable terminals of the plurality of the wireless relay devices within range of the first cell is larger than the total number of the number of connectable terminals of the plurality of the wireless relay devices within range of the second cell.

10. The control device according to claim 4, wherein the determination portion is configured to determine the number of available resources for each of the plurality of the wireless relay devices so that the total number of the number of available resources of the plurality of the wireless relay devices within range of the first cell is larger than the total number of the number of available resources of the plurality of the wireless relay devices within range of the second cell.

11. The control device according to claim 4, wherein the wireless relay device is movable,
   the information obtaining portion is configured to obtain a movement speed of each of the plurality of the wireless relay devices within range of the first cell, and
   the determination portion is configured to determine a larger number of the connectable terminals or a larger number of the available resources for the wireless relay devices having a slower movement speed among the plurality of the wireless relay devices within range of the first cell.

12. The control device according to claim 4, wherein
the wireless relay device is movable,
the information obtaining portion is configured to obtain movement information indicating whether each of the plurality of the wireless relay devices within range of the first cell are moving or not, and
the determination portion is configured to determine a larger number of the connectable terminals or a larger number of the available resources for the wireless relay devices that is not moving as compared with the wireless relay device that is moving among the plurality of the wireless relay devices within range of the first cell.

13. The control device according to claim 4, wherein
the information obtaining portion is configured to obtain location information of each of the plurality of the wireless relay devices within range of the first cell, and
the determination portion is configured to determine a larger number of the connectable terminals or a larger number of the available resources for the wireless relay devices that is closer to the radio base station forming the first cell among the plurality of the wireless relay devices within range of the first cell.

14. The control device according to claim 4, wherein
the information obtaining portion is configured to obtain radio wave reception intensity from the radio base station forming the first cell for each of the plurality of the wireless relay devices within range of the first cell, and
the determination portion is configured to determine a larger number of the connectable terminals or a larger number of the available resources for the wireless relay devices that has a stronger radio wave reception intensity among the plurality of the wireless relay devices within range of the first cell.

15. The control device according to claim 4, wherein
the wireless relay device is an automobile equipped with a battery,
the information obtaining portion is configured to obtain information indicating whether each of the plurality of wireless relay devices within range of the first cell is charging the battery, and
the determination portion is configured to determine a larger number of the connectable terminals or a larger number of the available resources for the wireless relay device that is charging as compared to the wireless relay device that is not charging among the plurality of the wireless relay devices within range of the first cell.

16. A non-temporary computer-readable storage medium that stores a program for causing a computer to function as a control device, the control device comprising:
an information obtaining portion configured to obtain a type of a cell of which a wireless relay device is within range, the wireless relay device being within range of the cell of a radio base station and for relaying communication between the radio base station and a communication terminal; and
a determination portion configured to determine, based on the type of the cell obtained by the information obtaining portion, a number of connectable terminals indicating a number of communication terminals that are connectable with the wireless relay device, or a number of available resources indicating a number of wireless resources that are available to use for communication between the wireless relay device and the communication terminal.

17. A control method executed by a computer, comprising:
an information obtaining step of obtaining a type of a cell of which a wireless relay device is within range, the wireless relay device being within range of the cell of a radio base station and for relaying communication between the radio base station and a communication terminal; and
a determination step of determining, based on the type of the cell obtained by the information obtaining step, a number of connectable terminals indicating a number of communication terminals that are connectable with the wireless relay device, or a number of available resources indicating a number of wireless resources that are available to use for communication between the wireless relay device and the communication terminal.

18. A wireless relay device that is within range of a cell of a radio base station and configured to relay communication between the radio base station and a communication terminal, comprising:
an information obtaining portion configured to obtain a type of the cell of which the wireless relay device is within range;
a determination portion configured to determine, based on the type of the cell obtained by the information obtaining portion, a number of connectable terminals indicating a number of communication terminals that are connectable, or a number of available resources indicating a number of wireless resources that are available to use for communication with the communication terminal; and
a terminal communication unit configured to establish a communication connection with the communication terminal based on the number of connectable terminals or the number of available resources determined by the determination portion.

19. The wireless relay device according to claim 18, wherein
the terminal communication unit is configured to establish a communication connection with the communication terminal up to the number of connectable terminals determined by the determination portion.

20. The wireless relay device according to claim 18, wherein
the terminal communication unit is configured to allocate a wireless resource to the communication terminal based on the number of available resources determined by the determination portion.

21. A non-temporary computer-readable storage medium configured to store a program for causing a computer to function as a wireless relay device that is within range of a cell of a radio base station and configured to relay communication between the radio base station and a communication terminal, the wireless relay device comprising:
an information obtaining portion configured to obtain a type of the cell of which the wireless relay device is within range;
a determination portion configured to determine, based on the type of the cell obtained by the information obtaining portion, a number of connectable terminals indicating a number of communication terminals that are connectable, or a number of available resources indicating a number of wireless resources that are available to use for communication with the communication terminal; and
a terminal communication unit configured to establish a communication connection with the communication terminal based on the number of connectable terminals or the number of available resources determined by the determination portion.

22. A control method executed by a wireless relay device that is within range of a cell of a radio base station and configured to relay communication between the radio base station and a communication terminal, comprising:
- an information obtaining step of obtaining a type of the cell of which the wireless relay device is within range;
- a determination step of determining, based on the type of the cell obtained by the information obtaining step, a number of connectable terminals indicating a number of communication terminals that are connectable, or a number of available resources indicating a number of wireless resources that are available to use for communication with the communication terminal; and
- a terminal communication step of establishing a communication connection with the communication terminal based on the number of connectable terminals or the number of available resources determined by the determination portion.

* * * * *